(12) United States Patent
Lopan et al.

(10) Patent No.: US 10,912,248 B2
(45) Date of Patent: Feb. 9, 2021

(54) MOWING DEVICE

(71) Applicant: SIP Strojna industrija d.d., Sempeter v Savinjski dolini (SI)

(72) Inventors: Damjan Lopan, Tabor (SI); David Sekoranja, Celje (SI); Sebastjan Bogataj, Gomilsko (SI)

(73) Assignee: SIP STROJNA INDUSTRIJA D.D.

( * ) Notice: Subject to any disclaimer, the term of this patent is extended or adjusted under 35 U.S.C. 154(b) by 93 days.

(21) Appl. No.: 16/174,502

(22) Filed: Oct. 30, 2018

(65) Prior Publication Data

US 2019/0133025 A1 May 9, 2019

(30) Foreign Application Priority Data

Oct. 30, 2017 (EP) ..................................... 17199222

(51) Int. Cl.
*A01B 73/04* (2006.01)
*A01D 75/30* (2006.01)
(Continued)

(52) U.S. Cl.
CPC .......... *A01B 73/044* (2013.01); *A01B 73/048* (2013.01); *A01B 73/067* (2013.01); *A01D 34/661* (2013.01); *A01D 75/303* (2013.01)

(58) Field of Classification Search
CPC ..... A01B 73/042; A01B 73/02; A01B 73/044; A01B 73/067; A01B 73/048; A01D 34/44;
(Continued)

(56) References Cited

U.S. PATENT DOCUMENTS 3,650,096 A * 3/1972 Caldwell .............. A01B 73/044
56/7
4,418,762 A * 12/1983 Page ...................... A01B 73/02
172/311
(Continued)

FOREIGN PATENT DOCUMENTS

EP 3 028 557 A1 6/2016
FR 2 904 182 A1 2/2008

OTHER PUBLICATIONS

EPO Search Report, EP 17199222.5-1006 dated Apr. 10, 2018, 9 pages.
(Continued)

*Primary Examiner* — Robert E Pezzuto
(74) *Attorney, Agent, or Firm* — Ware, Fressola, Maguire & Barber LLP (57) ABSTRACT

A mowing device (10) has a central frame mounted on wheels (16a, 16b) carrying at least two mowing units (20a, 20b) which are each connected to the central frame (12) via a connection unit (24a, 24b), wherein a connection unit (24a, 24b) includes a main pivot arm (28a, 28b) and an outer pivot arm (26a, 26b), the outer pivot arm (26a, 26b) connected to the main pivot arm (28a, 28b) in such a manner that it is pivotable about an outer arm joint (34a, 34b) relative to the main pivot arm (28a, 28b), the connection unit (24a, 24b) further including a mowing unit joint (32a, 32b) for connecting the mowing unit (20a, 20b) to the outer pivot arm (26a, 26b), the mowing unit joint (32a, 32b) arranged at the end of the outer pivot arm (26a, 26b) that is remote from the outer arm joint (34a, 34b).

16 Claims, 6 Drawing Sheets

(51) Int. Cl.
*A01D 34/00* (2006.01)
*A01B 73/06* (2006.01)
*A01D 34/66* (2006.01)

(58) Field of Classification Search
CPC .. A01D 34/661; A01D 75/306; A01D 75/303; A01D 75/30
USPC ............ 56/6, 7, 26, 504, 505, 255; 172/311, 172/452, 456, 460, 458, 457, 446, 776
See application file for complete search history.

(56) References Cited

U.S. PATENT DOCUMENTS

| | | | | |
|---|---|---|---|---|
| 4,896,732 | A * | 1/1990 | Stark | A01B 73/02 172/311 |
| 5,427,182 | A | 6/1995 | Winter | |
| 6,131,378 | A | 10/2000 | Lees | |
| 8,769,916 | B2 | 7/2014 | Van Loon | |
| 2014/0033671 | A1* | 2/2014 | Halter | A01D 34/66 56/255 |
| 2016/0150717 | A1* | 6/2016 | Speer | A01B 59/042 56/6 |
| 2017/0172054 | A1 | 6/2017 | Sammut | |
| 2018/0263169 | A1* | 9/2018 | Anderson | A01D 34/736 |

OTHER PUBLICATIONS

Bibliographic data for FR 2 904 182, including English abstract, 1 page.

\* cited by examiner

MOWING DEVICE

BACKGROUND

The invention relates to a mowing device, and to a method for operating a mowing device.

EP 3 028 557 A1 discloses a mowing device which has a wheel-supported central frame. The central frame carries two mowing units that are connected to the central frame via a connection unit each, with the central frame extending in a central frame direction perpendicular to the wheel axis, i.e. in the direction of travel. Each connection unit comprises a main pivot arm and an outer pivot arm, with the outer pivot arm being connected to the main pivot arm so as to be pivotable, via an outer arm joint, about an outer arm pivot axis relative to the main pivot arm. Furthermore, the connection unit comprises a mowing unit joint for connecting a mowing unit to the outer pivot arm, thus allowing the mowing unit to be pivoted about a pivot axis of the mowing unit. The mowing unit pivot axis is located at the end of the outer arm that is remote from the pivot axis of the outer arm and extends at approx. 90° relative to the outer arm pivot axis. The main arm is connected to the central frame via a main arm joint which has a pivot axis that is parallel to the central frame direction.

US 2017/0172054 A1 relates to mowing equipment similar to what is disclosed in EP 3 028 557 A1, but in which the part of the central frame supporting the mowing devices is additionally connected to other parts of the central frame.

U.S. Pat. No. 6,131,378 pursues a similar approach in which mowing units that can be extended are mounted on a load-bearing element, said load-bearing element being pivotable relative to the tractor wheel axis.

This arrangement has the disadvantage that the cutting height can only be adjusted to a limited extent.

SUMMARY

It is the object of the invention to enable a more flexible adjustment of the cutting height and still achieve the smallest possible pack size in the transport condition.

In a known manner, a mowing device has a wheel-supported central frame. The central frame comprises a coupling device for coupling the mowing device to a tractor. The central frame carries at least two mowing units which are connected to the central frame via a connection unit each, with the central frame extending in a central frame direction perpendicular to the wheel axis, i.e. in the direction of travel. A connection unit comprises a main pivot arm and an outer pivot arm, with the outer pivot arm being connected to the main pivot arm so as to be pivotable relative to the main pivot arm about an outer arm pivot axis, via an outer arm pivot joint. The connection unit further comprises a mowing unit joint for connecting a mowing unit to the outer pivot arm so as to enable the mowing unit to be pivoted about a mowing unit pivot axis. The mowing unit pivot axis is located at the end of the outer pivot arm that is remote from the pivot axis of the outer arm. The mowing unit pivot axis extends at right angles to the outer arm pivot axis. As used in the context of the present invention, the term 'at right angles' shall refer to a perpendicular position, with a deviation of 5°, i.e. an angle range of between 85° and 95°, but in particular 90°.

In accordance with the invention, the connection unit comprises a main element which connects the central frame to the main pivot arm, the main element being pivotable relative to the central frame about a horizontal main element pivot axis which is perpendicular to the central frame direction which is also horizontal in particular. The main element pivot axis is thus parallel to the wheel axis. In addition, the main pivot arm is pivotably connected to the main element via a main arm joint in such a manner that it can be pivoted about a main arm pivot axis on the main element, the main arm pivot axis extending at right angles to the main element pivot axis. The main arm pivot axis preferably extends at right angles to the main element pivot axis and to the outer arm pivot axis, with the outer arm pivot axis also extending at right angles to the main element pivot axis.

This results in an approximately vertical position of the outer arm pivot axis in the working position, and in a horizontal position for the main arm pivot axis and the main element pivot axis.

The distance between the front end of the mowing unit and the ground, and thus the cutting height, can be adjusted very precisely and easily by means of a connection using such a main element.

Two first connection units are preferably connected opposite each other to the central frame. This ensures a symmetrical distribution of the working load.

In another advantageous embodiment, the first two connection units can thus comprise a common main element, or two main elements of the first two connection units can be coupled mechanically. This is a simple way of ensuring that the cutting height of the two mowing units can be adjusted synchronously.

According to a further embodiment, it is possible that in the working position, the width of the mowing unit, i.e. the extent in the direction transverse to the central frame, is smaller than twice the length of the outer pivot arm of the first connection unit.

This ensures that the mowing unit does not project beyond the outer arm joint when mounted centrally on the outer pivot arm. This has a particular effect on the configuration in the transport position.

In a particularly preferred embodiment, it is proposed that two first mowing units are connected to the central frame via two first connection units, and two additional mowing units are provided that are connected to the central frame via two opposite second connection units, with the second connection unit comprising a main pivot arm which can be pivoted about the mowing unit about a pivot axis that extends in, or parallel to, the central frame direction. In particular, a mowing unit comprises a cutter bar.

In yet another advantageous embodiment, it is proposed that in a rear section of the central frame, two rear mowing units are connected to the central frame via two first connection units, in particular opposite one another and, furthermore, two front mowing units are connected to the central frame via one second connection unit each, in particular opposite one another, in front of the rear mowing units, as viewed in the central frame direction.

The second connection unit can preferably comprise a main element which is connected to the central frame via a main element joint, with said main element extending about a main element pivot axis perpendicular to the central frame direction, in particular parallel to the wheel axis, so that the outer pivot arm can also be pivoted about the main element pivot axis.

It is also advantageous for the second connection unit if two first connection units located opposite one another on the central frame are provided, that the main elements of the first connection units form a common main element, with both outer pivot arms being connected to the central main element.

Preferably, the distance between the main element pivot axis of the first connection device and the main element pivot axis of the second connection device can be greater than the length of the main arm. This reliably prevents a collision of the connection device during transport. If lower mowing units are provided, the distance between the main element pivot axes can correspond, for example, to the sum of the length of the main pivot arm of the first connection unit and half the depth of the front mowing unit.

According to another preferred embodiment, a pivot drive of the main element of the first connection unit can be implemented by two hydraulic cylinders located the one behind the other and connected to the central frame. This allows the main element of the first connection unit to be pivoted in steps. Thus the first cylinder can be used to adjust the cutting height, and the second cylinder can be used to tilt the main element between a transport position and a working position thereof. The two cylinders can also be implemented in a single cylinder.

Preferably, the main element of the first connection element and the main element of the second connection element can be connected mechanically in such a manner that the main elements can be pivoted together. This allows both main elements to be connected to the first hydraulic cylinder.

In particular, the wheels that support the central frame are located between the first connection units and the second connection units. A position in which the wheel axis is as close as possible to the first main element pivot axis is a suitable solution here.

The invention also relates to a method for changing the position of an agricultural machine from a working position to a transport position and vice versa.

In the working position, the first mowing units, which are each connected to the central frame via a first connection unit, are close to the ground, with the mowing unit pivot axis and the main arm pivot axis being approximately parallel to the central frame direction, and the main pivot arm extending at an angle of less than 10° relative to the horizontal.

First of all, the main pivot arm is pivoted upward around the main arm pivot axis. The pivot angle covered in this movement is between 10° and 20°. This results in the mowing units being lifted off the ground and thus gaining some ground clearance. This ground clearance is also used when the machine makes a turn during mowing or when it changes tracks.

The main element is then pivoted forward around the main element pivot axis by between 10° and 20°, in particular 15°. This gives the first mowing units additional ground clearance. If the main element is located behind the wheels, the forward pivot angle is limited in that, when the main pivot arm is pivoted in, it must be possible for the mowing unit to be pivoted over the wheel without colliding with the wheel.

Next, the outer pivot arm with the mowing unit is rotated backward around the outer pivot axis by 120° to 150°, in particular 140°. Since the length of the main pivot arm preferably corresponds at least to the width of the mowing unit, the folding process can be carried out without any collision of the two mowing units if two first connection units are arranged symmetrically opposite one another.

The mowing units can then be locked in position after having been pivoted back.

The main pivot arms are then pivoted upward around the main arm pivot axis until they reach an angle of approximately 75° to 85° relative to the main element pivot axis. In the case of a symmetrical arrangement, the two main pivot arms are then slightly inclined towards each other. This corresponds to a pivot movement of about 90°.

Subsequently, the main element is pivoted forward until it lies on a fixing element that fixes the main element pivot arm in its transport position. The transport position is at an angle of about 60° to 20° between the main pivot arm and the central frame direction. This allows a sufficient distance to be maintained between the mowing unit and the wheel.

In the event that there is a second mowing unit, as described above, in front of the first mowing unit, the former can simply be tilted upward by about 90°. This step can take place before, during or after the folding of the first connection devices.

The machine is changed from a transport position to a working position in reverse order. Additional advantages, features and possible applications of the present invention may be gathered from the description which follows, in which reference is made to the embodiments illustrated in the drawings.

BRIEF DESCRIPTION OF THE DRAWINGS

Throughout the description, the claims and the drawings, those terms and associated reference signs are used as are listed in the List of Reference Signs which follows below. In the drawings.

DETAILED DESCRIPTION

Figure 1:
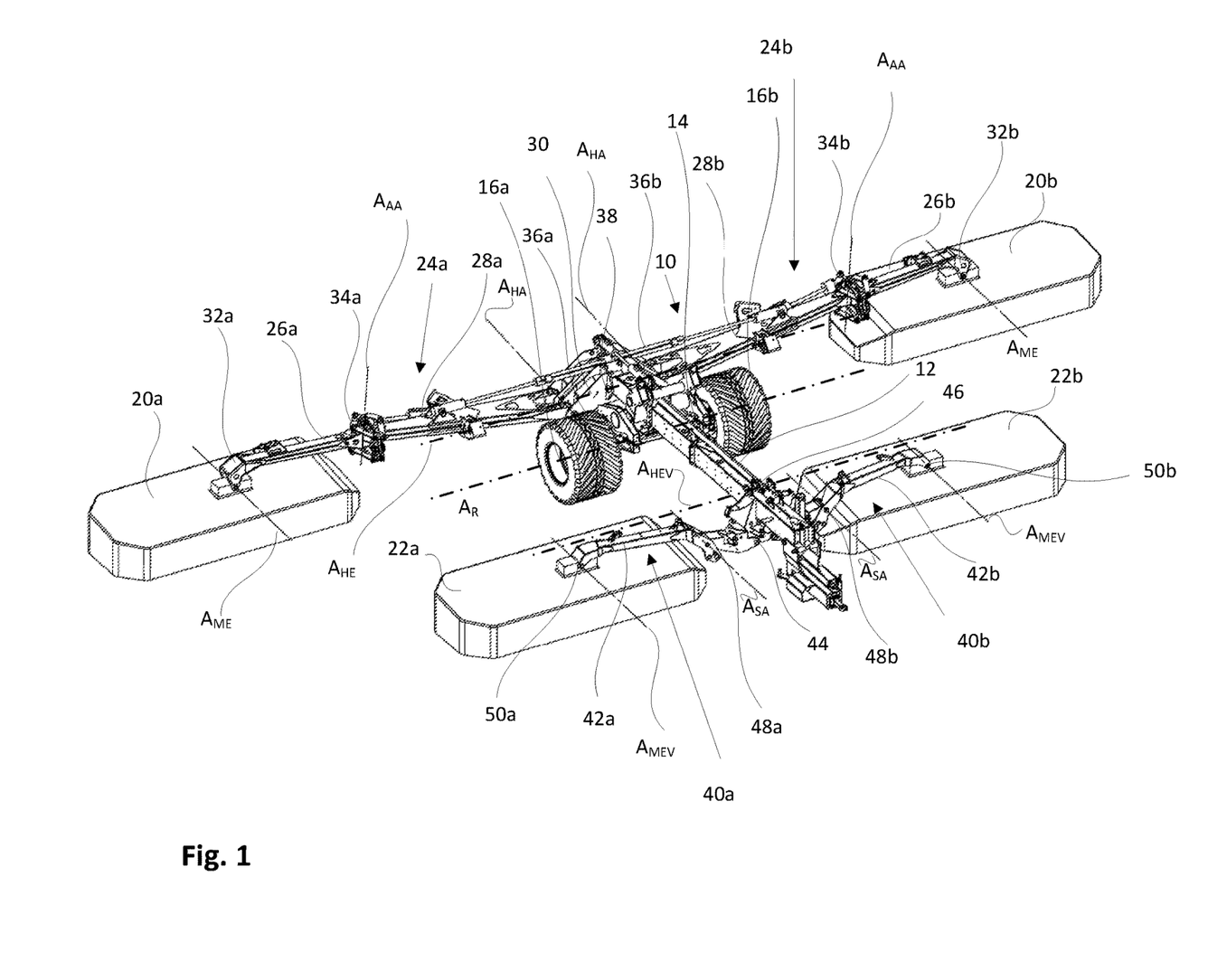
FIG. 1 is a perspective view of a mowing device according to the invention, in a working position thereof.

FIG. 1 is a perspective view of a mowing device 10 according to the invention. The mowing device comprises a central frame 12 which is supported by a wheel axle 14 with two wheels 16a, 16b. The mowing device 10 comprises two first mowing units 20a, 20b and two second mowing units 22a, 22b, with the first mowing units being arranged behind the second mowing units in the direction of travel.

The first mowing units 20a, 20b are connected to the central frame 12 via a first connection device 24a, 24b each. The first connection device 24a, 24b comprises an outer pivot arm 26a, 26b, a main pivot arm 28a, 28b, and a first main element 30 each, with the first main element 30 serving as the common main element in both connection devices 24a, 24b.

The first mowing units 20a, 20b are connected to the outer pivot arm 26a, 26b by a mowing unit joint 32a, 32b, and the outer pivot arm 26a, 26b is connected to the main pivot arm 28a, 28b by an outer pivot arm 34a, 34b. The main pivot arm 28a, 28b in turn is connected to the first main element 30 by a main arm joint 36a, 36b. The first main element 30 is pivotally connected to the central frame 12 via a main element joint 38.

The main element joint 38 is designed to define a first main element pivot axis $A_{HE}$ parallel to the wheel axis $A_R$. The main arm joint 36a, 36b is designed to define a main arm pivot axis $A_{HA}$ which is perpendicular to the first main element pivot axis $A_{HE}$, i.e. which lies in a plane whose normal is the first main element pivot axis $A_{HE}$.

The outer arm joint 34a, 34b is designed to define an outer arm pivot axis $A_{AA}$. The outer arm pivot axis $A_{AA}$ is transverse, especially perpendicular, to the main arm pivot axis $A_{HA}$.

The mowing unit joint 32a, 32b is designed to define a first mowing unit pivot axis $A_{ME}$ which is parallel to the main arm pivot axis $A_{HA}$.

The second mowing units 22a, 22b are connected to the central frame 12 via a second connection unit 40a, 40b each. The second connection unit comprises a lateral pivot arm 42a, 42b, and a common second main element 44 each.

The second main element 44 is pivotally connected to the central frame 12 via a second main element joint 46. The lateral pivot arm 42a, 42b is connected to the main element 44 via a side arm joint 48a, 48b. The lateral pivot arm 42a, 42b is also connected to the mowing unit 22a, 22b via a mowing unit 30 joint 50a, 50b.

The second main element joint 46 is designed to define a second main element pivot axis $A_{HEV}$ which is parallel to the wheel axis $A_R$ and thus parallel to the first main element pivot axis $A_{HE}$. The side arm joint 48a, 48b is designed to define a side arm pivot axis $A_{SA}$. The side arm pivot axis $A_{SA}$ is transverse, in particular perpendicular, to the second main element pivot axis $A_{HEV}$. The mowing unit joint 50a, 50b is designed in such a way that it defines a second mowing unit pivot axis $A_{MEV}$ which is parallel to the side arm pivot axis $A_{SA}$.

In the working position shown in FIG. 1, the second mowing unit pivot axes $A_{MEV}$ are parallel to the front mowing unit pivot axes $A_{ME}$.

By pivoting the first main element 30 around the main element pivot axis $A_{HE}$ and the second main element 44 around the main element pivot axis $A_{HEV}$, the mowing units 20a, 20b; 22a, 22b are also pivoted at the same angle due to the design of the connection devices 24a, 24b and connection units 40a, 40b, thus allowing an ideal adjustment to the cutting height.

The first main element 30 and the second main element 44 are mechanically connected so that the two pairs of mowing units can be pivoted synchronously.

Figure 2:
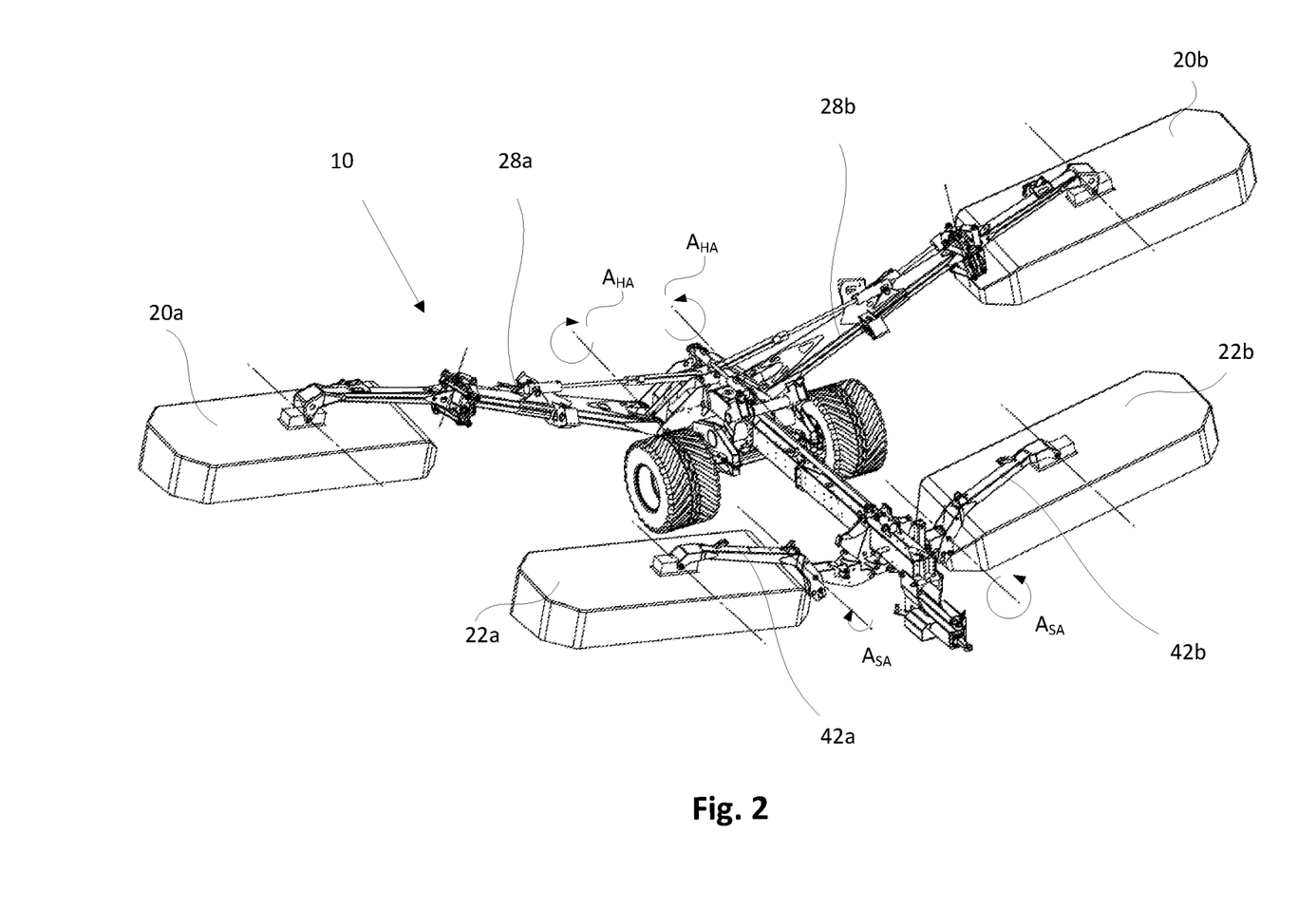
FIG. 2 is a perspective view of the mowing device of FIG. 1 in a position after a first pivot movement.

FIG. 2 is a perspective view of the mowing device 10 of the invention, in a headland position following a first pivot movement of the folding process, i.e. for changing it to the transport position. In a first pivot movement from the working position, both the main pivot arms 28a, 28b of the first connection devices or units 24a, 24b are pivoted upward by about 15° around the main arm pivot axis $A_{HA}$ and the side arms 42a, 42b of the second connection units 40a, 40b are pivoted upward by about 15° around the side arm pivot axes $A_{SA}$. This gives the mowing units 20a, 20b; 22a, 22b ground clearance.

The main elements 30, 44 of the first connection units 24a, 24b and the second connection units 40a, 40b are in their original position at a pivot angle of 0°, at which the main arm pivot axis $A_{HA}$ and the side arm pivot axes $A_{SA}$ extend horizontally.

This pivot mode can also be used during turning maneuvers or when changing mowing tracks, in order to briefly interrupt the mowing process. The mowing units 20a, 20b, 22a, 22b are hydraulically locked during this process.

Figure 3:
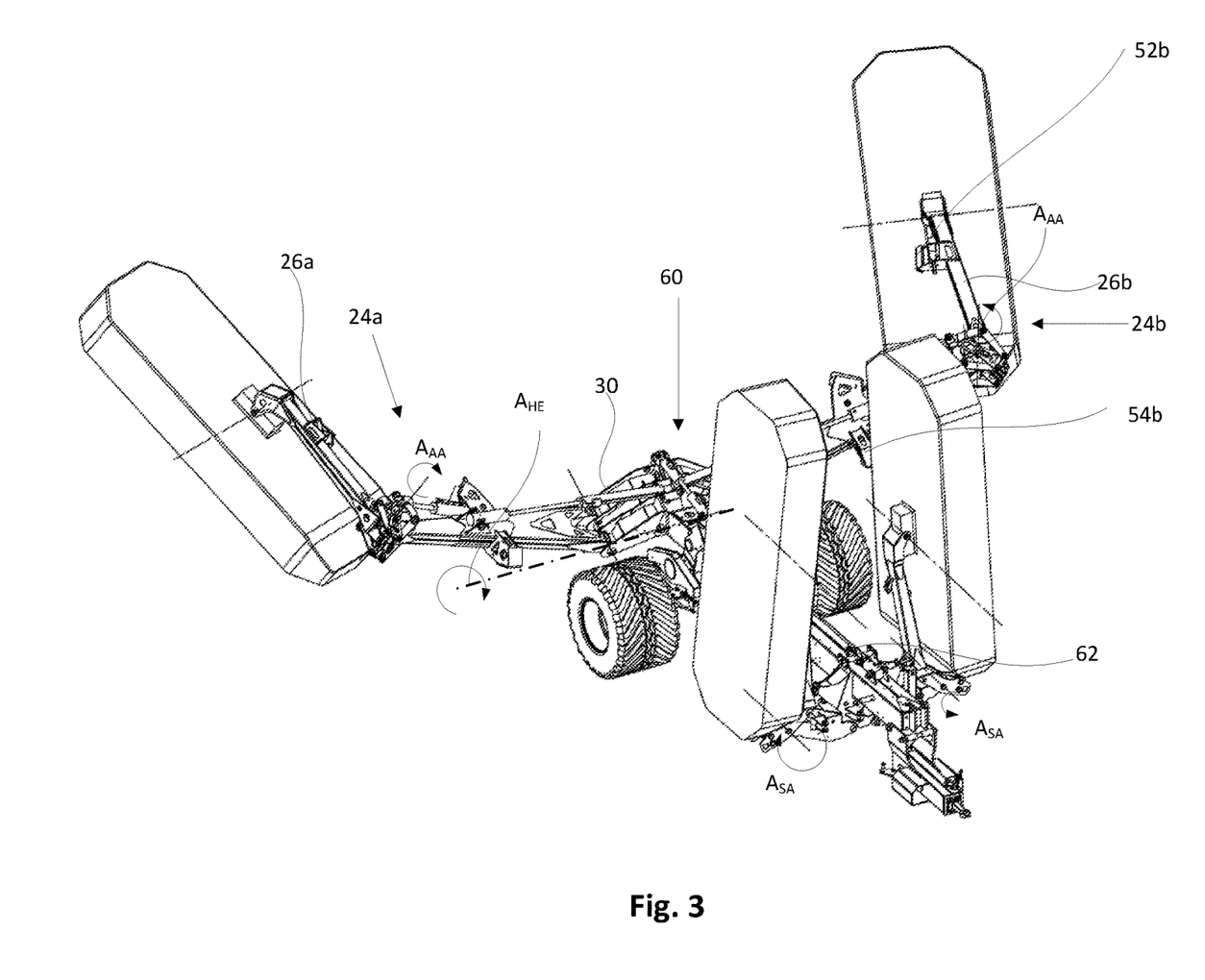
FIG. 3 is a perspective view of the mowing device of FIG. 1 in a position after another pivot movement.

FIG. 3 is a perspective view of the mowing device 10 of the invention in a next position thereof during the folding process.

The first main element 30 of the first connection units 24a, 24b has been pivoted forward by about 15° around the main element pivot axis $A_{HE}$ so that the mowing units 20a, 20b gain further ground clearance. The forward pivot movement is performed by means of a two-part hydraulic cylinder 60. This pivot movement can therefore take place independently of a pivot movement of the second main element 44, although the first main element 30 of the first connection unit and the second main element 44 of the second connection units can be inclined together by means of a cylinder 62 so as to realize a height adjustment of the mowing units.

Moreover, from its shown position, the outer pivot arm 26a, 26b was then pivoted around the outer arm pivot axis $A_{AA}$ by about 80°. The end position of this pivoting process around the outer arm pivot axis $A_{AA}$ is about 130°, so that the mowing units 20a, 20b almost touch each other and that, at the outer arm joint, the outer pivot arm 26a, 26b and the main pivot arm 28a, 28b define an angle of about 50° between them.

Figure 4:
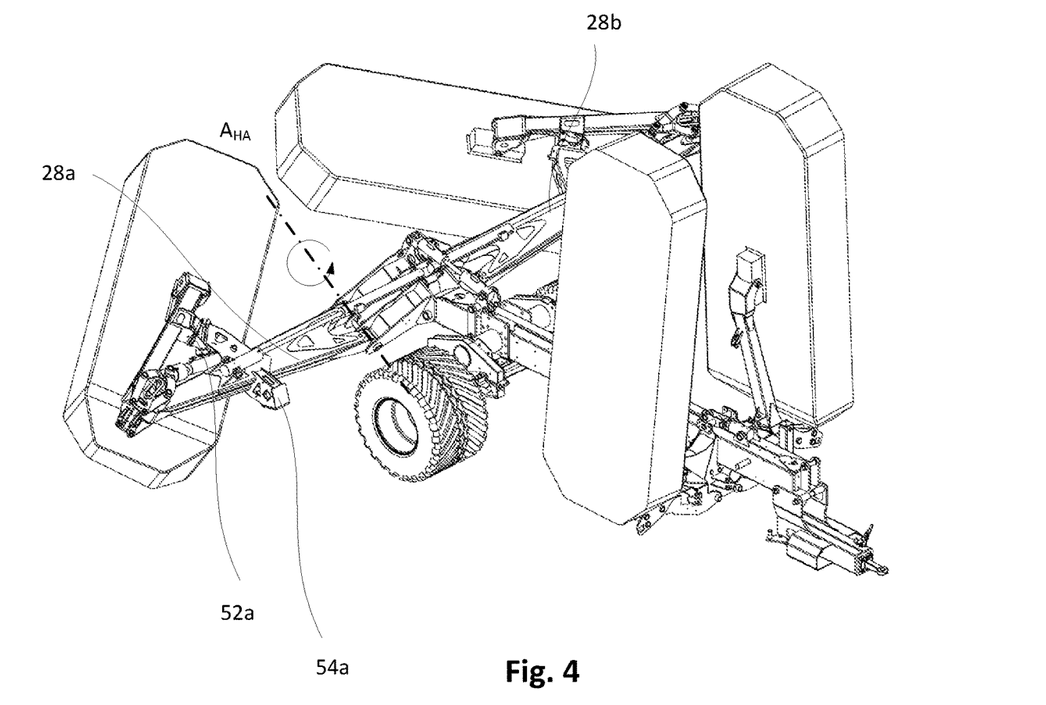
FIG. 4 is a perspective view of the mowing device of FIG. 1 in a position in which its outer pivot arms are locked.

This end position is illustrated in FIG. 4. This position shows the mowing units 20a, 20b pivoted back about the outer arm pivot axis $A_{AA}$ by about 140°. In this position, the outer pivot arms are locked in position with respect to the main pivot arms 28a, 28b by means of locking pins 52a, 52b.

In addition, an additional pivot process of the main pivot arm 28a, 28b is performed around the main arm pivot axis $A_{HA}$ at an angle of about 90°, resulting in the main pivot arms 28a, 28b being inclined slightly inward towards the central frame. In their transport position, the first mowing units 20a, 20b are also slightly inclined inward.

Figure 5:
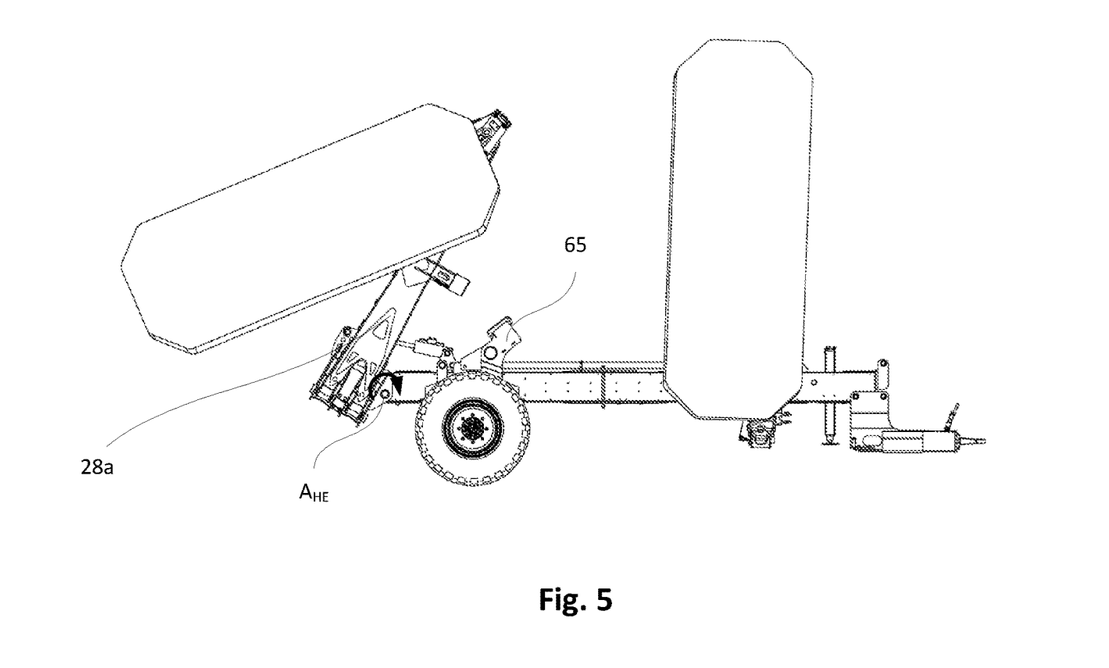
FIG. 5 is a lateral view of the mowing device of FIG. 1 in a position after the main pivot arms have been folded up.

This position can be seen in the lateral view of FIG. 5, with the process of changing the machine from the working position to the transport position being completed in that the main pivot arms 28a, 28b, which were folded in as described above, come to rest on support arms 65 by a forward pivot movement of the first main element 30 by about 50°, and are locked in their transport position by means of locking pins 54a, 54b.

Once more, the side arms 42a, 42b are pivoted upward about the side arm pivot axes $A_{SA}$ by approx. 90°, thus assuming their end position slightly inclined to the center of the frame, and are then locked in their transport position.

Figure 6A:
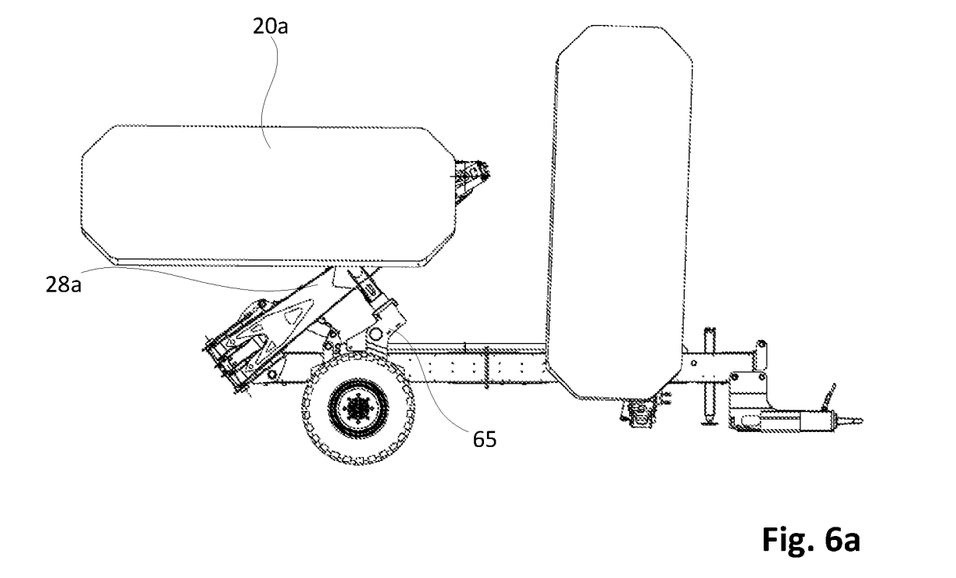
FIG. 6a is a lateral view of the mowing device of FIG. 1 in a transport position thereof.
Figure 6B:
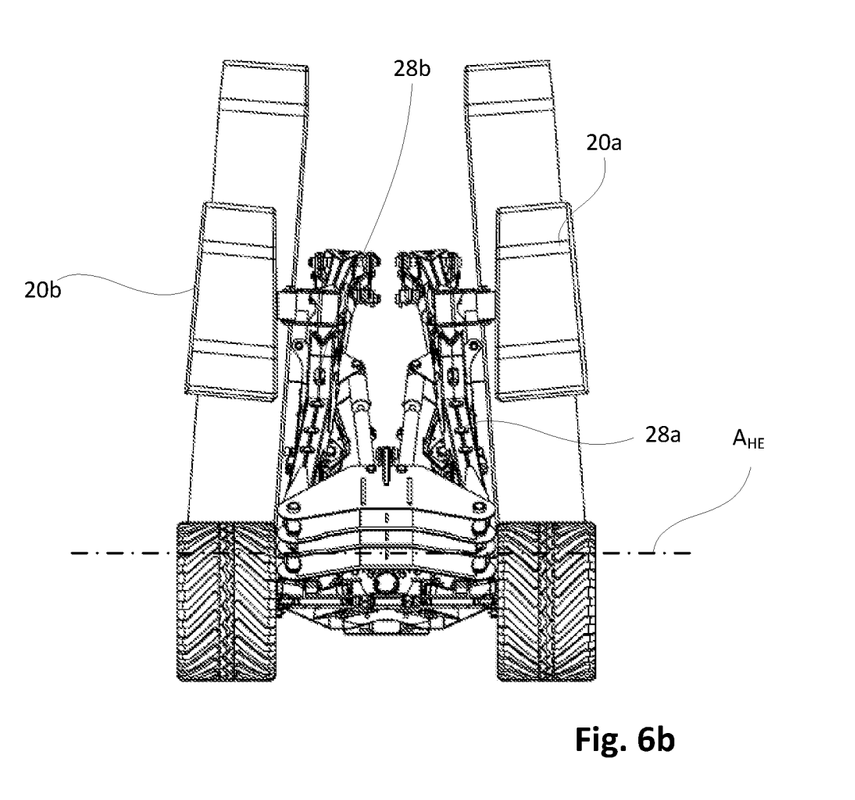
FIG. 6b is a rear view of the mowing device of FIG. 1 in a transport position thereof.

FIG. 6a and FIG. 6b are views of the mowing unit 10 in its transport position, with FIG. 6a being a lateral view and FIG. 6b a rear view thereof.

This results in a compact transport configuration.

Figure 7:
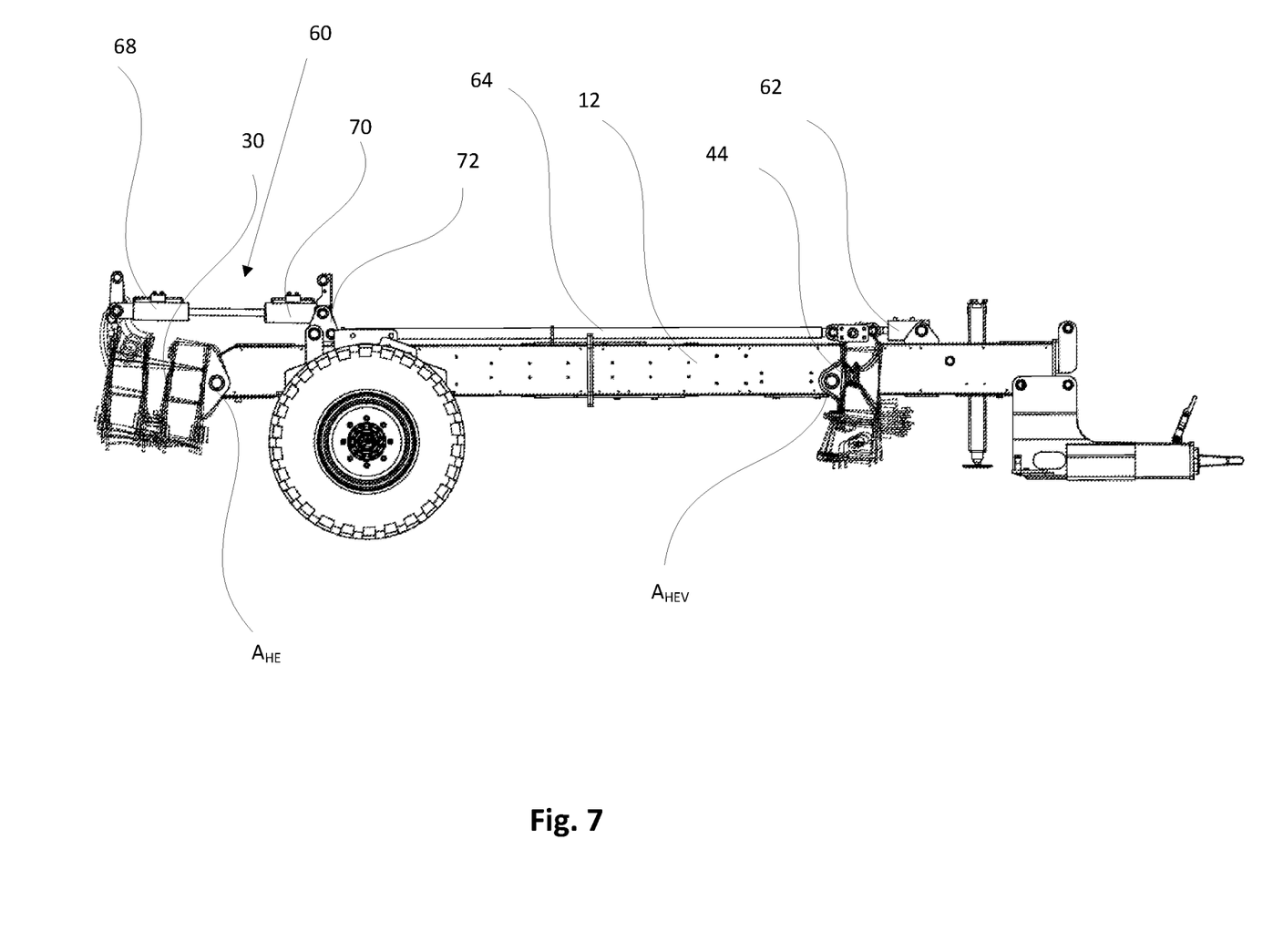
FIG. 7 is a detail view of the pivot arrangement of the main elements.

FIG. 7 is a detail view of the arrangement for adjusting the cutting height. As shown, the main element 30 of the first connection unit is arranged behind the wheel axle and can be pivoted around the main element pivot axis $A_{HE}$. Arranged in front of the wheel axle is the main element 44 of the second connection unit which is pivotally mounted around the front main element pivot axis $A_{HEV}$. At a distance from the main element pivot axis $A_{HE}$, two serially connected cylinders 68, 70 engage the main element 30 and, via a bearing 72, the central frame 12. In this case, the serial arrangement of cylinders 68, 70 has been implemented such that the piston rod of the two cylinders 68, 70 is a constructional unit, resulting in a two-part hydraulic cylinder 60 which, when pressurized appropriately, reliably realizes two defined pivot states or pivot angles. Via the bearing 72, the main element 30 is also connected to the front main element 44 by a rod 64. This rod 64 is actuated by a cylinder 62 connected to the central frame 12 so that, when actuated, the same inclination angle results for the main element 30 of the first connection unit and for the main element of the second connection unit and consequently for the corresponding mowing units.

LIST OF REFERENCE SIGNS 10 mowing device
12 central frame
14 wheel axle
16a, 16b wheels
20a, 20b two first mowing units
22a, 22b two second mowing units
24a, 24b first connection unit
26a, 26b outer pivot arm
28a, 28b main pivot arm
30 first main element
32a, 32b mowing unit joint
34a, 34b outer arm joint
36a, 36b main arm joint
38 main element joint
40a, 40b second connection unit
42a, 42b lateral pivot arm
44 second main element
46 second main element joint
48a, 48b side arm joint
50a, 50b mowing unit joint
52a, 52b locking pin
54a, 54b locking pin
60 two-piece hydraulic cylinder
62 cylinder
64 rod
65 support arm
68 cylinder
70 cylinder
72 bearing
$A_{HE}$ first main element pivot axis
$A_R$ Wheal axis
$A_{HA}$ main arm pivot axis
$A_{AA}$ outer arm pivot axis
$A_{ME}$ first mowing unit pivot axis
$A_{HEV}$ second main element pivot axis
$A_{SA}$ side arm pivot axis
$A_{MEV}$ second mowing unit pivot axis

The invention claimed is:

1. A mowing device (10) comprising a central frame (12) that is mounted on wheels (16a, 16b) and that is coupleable to a tractor in order to tow the mowing device, wherein the central frame supports at least two mowing units (20a, 20b) that are each coupled to the central frame (12) via a respective connection unit (24a, 24b), wherein the central frame (12), extends in a longitudinal direction corresponding to a central frame direction of travel when towed, wherein the longitudinal direction extends perpendicular to an axis of the wheels ($A_R$), wherein each respective connection unit (24a, 24b) comprises a corresponding main pivot arm (28a, 28b) a corresponding outer pivot arm (26a, 26b), with the corresponding outer pivot arm (26a, 26b) connected to the corresponding main pivot arm (28a, 28b) such that the corresponding outer pivot arm is pivotable relative to the corresponding main pivot arm (28a, 28b) about a corresponding outer arm joint (34a, 34b) that defines a corresponding outer arm pivot axis ($A_{AA}$), wherein each respective connection unit (24a, 24b) further comprises a corresponding mowing unit joint (32a, 32b) for connecting the corresponding mowing unit (20a, 20b) to the corresponding outer pivot arm (26a, 26b), wherein the corresponding mowing unit joint (32a, 32b) is located at an end of the corresponding outer pivot arm (26a, 26b) that is remote from the corresponding outer arm joint (34a, 34b), wherein the corresponding mowing unit joint (32a, 32b) defines a corresponding mowing unit pivot axis ($A_{ME}$), wherein the corresponding mowing unit pivot axis is transverse to the corresponding outer arm pivot axis ($A_{AA}$), wherein each respective connection unit (24a, 24b) comprises a corresponding main element (30) that connects the central frame (12) to the corresponding main pivot arm (28a, 28b), wherein the corresponding main element (30) is connected to the central frame (12) via a corresponding main element joint (38) defining a corresponding main element pivot axis ($A_{HE}$), wherein the corresponding main element pivot axis ($A_{HE}$) is parallel to the axis of the wheels, wherein the corresponding main pivot arm (28a, 28b) is mounted on the corresponding main element (30) in such a manner that the corresponding main pivot arm (28a, 28b) is pivotable about a corresponding main arm pivot axis ($A_{HA}$), with the result that the corresponding main arm pivot axis ($A_{HA}$) extends at a right angle to the corresponding main element pivot axis ($A_{HE}$) and to the corresponding outer arm pivot axis ($A_{AA}$).

2. The mowing device according to claim 1, wherein the respective connection units (24a, 24b) of the at least two mowing units are mounted opposite one another on either side of the central frame (12).

3. The mowing device according to claim 2, wherein each corresponding main element (30) of each of two opposite mowing units of the at least two mowing units forms part of a common main element on the central frame.

4. The mowing device according to claim 1, each mowing unit has a width that is smaller than twice a length of the corresponding outer pivot arm (26a, 26b) of the corresponding connection unit.

5. The mowing device according to claim 1, wherein the at least two mowing units include two first mowing units that are each connected to the central frame via a respective first connection unit (24a, 24b), and wherein the at least two mowing units also include two second mowing units that are each connected to the central frame via a respective second connection unit (40a, 40b), each respective second connection unit comprising a corresponding lateral pivot arm (42a, 42b) that is pivotable via a mowing unit pivot joint (50a, 50b), relative to the corresponding lateral pivot arm about a corresponding mowing unit pivot axis ($A_{MEV}$) that extends at right angles to the wheel axis ($A_R$).

6. The mowing device according to claim 5, wherein each mowing unit of the two first mowing units (20a, 20b) is connected to a rear section of the central frame (12) via the respective first connection unit, and wherein each mowing unit of the two second mowing units is connected to the central frame (12) in front of a corresponding rear mowing unit via the respective second connection unit.

7. The mowing device according to claim 5, wherein each respective second connection unit comprises a corresponding main element (44, 46) and a corresponding lateral pivot arm (42a, 42b), with the corresponding main element 44 connected to the central frame (12) via a main element joint (46) which has a main element pivot axis ($A_{HEV}$) parallel to the wheel axis and with each corresponding lateral pivot arm connected to the corresponding main element via a corresponding side arm joint (48a, 48b), each corresponding side arm joint defining a pivot axis ($A_{SA}$) that extends at a right angle to the wheel axis ($A_R$).

8. The mowing device according to claim 6, wherein each respective second connection unit comprises a corresponding main element (44) and a corresponding lateral pivot arm (42a, 42b), with the corresponding main element connected to the central frame via a corresponding main element joint (46) having a corresponding main element pivot axis ($A_{HEV}$) that is parallel to the wheel axis ($A_R$), and with the corresponding lateral pivot arm connected to the main element via a corresponding side arm joint (48a, 48b), the corresponding side arm joint defining a pivot axis ($A_{SA}$) that extends at right angles to the wheel axis ($A_R$).

9. The mowing device according to claim 6, wherein a distance between each corresponding main element pivot axis ($A_{HE}$) of the first connection unit (24a, 24b) and the main element pivot axis ($A_{HEV}$) of each corresponding second connection unit (40a, 40b) is longer than is longer a length of the corresponding main pivot arm (28a, 28b).

10. The mowing device according to claim 6, wherein the main element (30) of each respective first connection unit (24a, 24b) is connected to the central frame (12) via a two-part hydraulic cylinder (60), so that the main element (30) is pivotable in at least two stages.

11. The mowing device according to claim 6, wherein the wheels supporting the central frame are located between each respective first connection unit of the corresponding two first mowing units (20a, 20b) and each respective second connection unit of the corresponding two second mowing units (22a, 22b).

12. The mowing device according to claim 10, wherein the main element (30) of each respective first connection unit is connected to the central frame via the two-part hydraulic cylinder so that the main element is inclineable for adjusting cutting height.

13. The mowing device according to claim 12, wherein the corresponding main element (30) of each respective first connection unit is connected to the corresponding main element (44) of each respective second connection unit in such a way that the corresponding main elements (30, 44) are pivoted together by a second hydraulic cylinder (62).

14. A method for changing the mowing device according to claim 1 from a working position to a transport position thereof, comprising:
pivoting the main pivot arm (28a, 28b) upward about the main arm pivot axis ($A_{HA}$) by a pivot angle of between 10° and 20°,
pivoting the main element (30) forward about the main element pivot axis ($A_{AE}$) by a pivot angle of between 10° and 20°,
pivoting the outer pivot arm (26a, 26b), together with the mowing unit (20a, 20b), backward about the outer pivot axis ($A_{AA}$) by a pivot angle of between 120° and 150°,
locking the outer pivot arm (26a, 26b),
pivoting the main pivot arms (28a, 28b) upward about the main arm pivot axis ($A_{HA}$) until an angle of between 75° and 85° relative to the main element pivot axis ($A_{HE}$),
pivoting the main element (30) forward about the main element pivot axis ($A_{HE}$) until it comes to lie on a fixing element that locks the main pivot arm (28a, 28b) in its transport position, and
locking the main pivot arm (28a, 28b) in the transport position.

15. The method for changing the mowing device according to claim 14 from a working position to a transport position thereof, wherein both the main arm pivot axis ($A_{HA}$) and the main element pivot axis ($A_{HE}$) are perpendicular in the working position.

16. The mowing device according to claim 1, wherein both the main arm pivot axis ($A_{HA}$) and the main element pivot axis ($A_{HE}$) are perpendicular in a working position of the mowing device.

\* \* \* \* \*